US010210273B2

(12) United States Patent
Lin et al.

(10) Patent No.: US 10,210,273 B2
(45) Date of Patent: Feb. 19, 2019

(54) ACTIVE REGIONS OF AN IMAGE WITH ACCESSIBLE LINKS

(75) Inventors: Qian Lin, Santa Clara, CA (US); Feng Tang, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 567 days.

(21) Appl. No.: 14/420,096

(22) PCT Filed: Aug. 31, 2012

(86) PCT No.: PCT/US2012/053492
§ 371 (c)(1),
(2), (4) Date: Feb. 6, 2015

(87) PCT Pub. No.: WO2014/035430
PCT Pub. Date: Mar. 6, 2014

(65) Prior Publication Data
US 2015/0242522 A1    Aug. 27, 2015

(51) Int. Cl.
*G06F 17/22*    (2006.01)
*G06F 17/30*    (2006.01)

(52) U.S. Cl.
CPC .... *G06F 17/30882* (2013.01); *G06F 17/2235* (2013.01); *G06F 17/3089* (2013.01)

(58) Field of Classification Search
CPC .................................. G06F 17/30; G06F 17/22
See application file for complete search history.

(56) References Cited

U.S. PATENT DOCUMENTS

| 7,860,309 | B1 * | 12/2010 | Bodnar | G06K 9/00677 358/538 |
| 8,054,170 | B1 * | 11/2011 | Brandt | G06K 9/4676 340/453 |
| 8,196,041 | B2 * | 6/2012 | Carro | G06F 3/044 715/702 |
| 8,666,169 | B2 | 3/2014 | Tang et al. | |
| 8,942,917 | B2 * | 1/2015 | Chrysanthakopoulos | G06K 9/00671 701/410 |
| 9,043,828 | B1 * | 5/2015 | Jing | H04N 21/258 358/1.6 |
| 9,430,876 | B1 * | 8/2016 | Loxam | G06T 19/006 |
| 2002/0075332 | A1 * | 6/2002 | Geilfuss, Jr. | G06Q 30/02 715/859 |

(Continued)

FOREIGN PATENT DOCUMENTS

CN          1971747          5/2007
WO     WO-2011017558        2/2011

(Continued)

OTHER PUBLICATIONS

Extended European Search Report and Written Opinion, Dec. 21, 2015, European Patent Application No. 12883623.6, 6 pages.

(Continued)

*Primary Examiner* — Asher D Kells
(74) *Attorney, Agent, or Firm* — HP Inc. Patent Department

(57) ABSTRACT

A computer device to generate an image with content and create active regions at locations or coordinates of the image including the content. The computing device associates the active regions with accessible links corresponding to the content.

22 Claims, 5 Drawing Sheets

(56) References Cited

U.S. PATENT DOCUMENTS

| | | | | |
|---|---|---|---|---|
| 2002/0181772 A1* | 12/2002 | Ihara | ................. | G06K 7/14 382/181 |
| 2003/0072568 A1* | 4/2003 | Lin | ................. | H04N 1/00795 396/222 |
| 2005/0080818 A1* | 4/2005 | Kindberg | ................. | H04N 1/21 |
| 2005/0165839 A1 | 7/2005 | Madan et al. | | |
| 2007/0211169 A1* | 9/2007 | Sigvaldason | ................. | G11B 27/10 348/468 |
| 2007/0240039 A1* | 10/2007 | Hosotsubo | ................. | G06F 17/211 715/210 |
| 2009/0111434 A1* | 4/2009 | Yu | ................. | H04L 51/14 455/414.1 |
| 2009/0161963 A1* | 6/2009 | Uusitalo | ................. | G06F 17/30855 382/203 |
| 2009/0240703 A1* | 9/2009 | Yoshino | ................. | G06F 17/3028 |
| 2009/0285487 A1* | 11/2009 | Knoblock | ................. | G06F 17/30061 382/190 |
| 2009/0313304 A1* | 12/2009 | Goodger | ................. | G06F 17/30896 |
| 2010/0023878 A1* | 1/2010 | Douris | ................. | H04L 12/6418 715/757 |
| 2010/0260426 A1* | 10/2010 | Huang | ................. | G06F 17/30247 382/218 |
| 2010/0289776 A1* | 11/2010 | Bryborn Krus | ................. | G06F 3/03545 345/179 |
| 2011/0085211 A1* | 4/2011 | King | ................. | G06F 17/30011 358/474 |
| 2011/0125614 A1* | 5/2011 | Dollens | ................. | G06Q 30/0603 705/27.2 |
| 2011/0145068 A1* | 6/2011 | King | ................. | G06F 17/211 705/14.55 |
| 2011/0202424 A1* | 8/2011 | Chun | ................. | G06F 3/0481 705/26.8 |
| 2011/0218018 A1* | 9/2011 | Phillips | ................. | G06F 17/30247 455/556.1 |
| 2012/0038671 A1* | 2/2012 | Min | ................. | G06T 19/00 345/633 |
| 2012/0057032 A1* | 3/2012 | Jang | ................. | G06K 9/228 348/207.1 |
| 2012/0075341 A1* | 3/2012 | Sandberg | ................. | G06F 17/30855 345/633 |
| 2012/0076423 A1* | 3/2012 | Tang | ................. | G06K 9/6211 382/203 |
| 2012/0131343 A1* | 5/2012 | Choi | ................. | H04L 63/0815 713/168 |
| 2012/0144282 A1* | 6/2012 | Loeb | ................. | G06F 17/30268 715/205 |
| 2012/0244907 A1* | 9/2012 | Athsani | ................. | G06F 3/011 455/556.1 |
| 2012/0256954 A1* | 10/2012 | Soon-Shiong | ................. | G06F 17/3087 345/633 |
| 2013/0100296 A1* | 4/2013 | Tang | ................. | G06F 17/30256 348/207.1 |
| 2014/0195382 A1* | 7/2014 | Ishiyama | ................. | G06K 9/6255 705/26.61 |
| 2014/0204119 A1* | 7/2014 | Malamud | ................. | G06L 19/006 345/633 |
| 2014/0282069 A1* | 9/2014 | Canetti | ................. | H04L 67/06 715/748 |
| 2015/0145889 A1* | 5/2015 | Hanai | ................. | H04N 5/2621 345/633 |
| 2015/0178777 A1* | 6/2015 | Jing | ................. | G06Q 30/0259 705/14.57 |
| 2015/0295959 A1* | 10/2015 | Lee | ................. | G06K 9/4604 709/204 |
| 2016/0171106 A1* | 6/2016 | Song | ................. | G06F 17/30867 707/709 |
| 2017/0293971 A1* | 10/2017 | Dollens | ................. | G06Q 30/0601 |

FOREIGN PATENT DOCUMENTS

| | | | | |
|---|---|---|---|---|
| WO | WO 2011017558 A1 * | 2/2011 | ....... | G06F 17/30256 |
| WO | WO-2012005387 A1 * | 1/2012 | ............ | H04N 7/183 |

OTHER PUBLICATIONS

"Printechnologics continues to Recieve Recognition for Its Innovative Touch code Technology", Apr 25, 2012.

Norrie, M.C. et al, "Print-n-Link: Weaving the Paper Web", Oct. 1-13, 2006.

Norri, M.C. et al, Switching Over to Paper: A New Web Channel, 2003.

Atkins, Blocked Recursive Image Composition, Oct. 2008 (4 pages).

Hunter et al., Web-based magazine design for self publishers, Web-based magazine design for self publishers Imaging and Printing in a Web 2.0 World II 2011 (6 pages).

* cited by examiner

ACTIVE REGIONS OF AN IMAGE WITH ACCESSIBLE LINKS

CROSS-REFERENCE TO RELATED APPLICATION

This application is a national stage application under 35 U.S.C. § 371 of PCT/US2012/053492, filed Aug. 31, 2012.

BACKGROUND

When accessing a website link or media link to view content, a user can initially enter a search term into an online search engine. The user can select a link from the search results with an input component and proceed to view the contents of the link. Alternatively if the user already knows a URL (uniform resource locator) address or an IP (internet protocol) address hosting the content, the user can manually enter the URL or IP address to view the content.

BRIEF DESCRIPTION OF THE DRAWINGS

In the accompanying drawings, like numerals refer to like components or blocks. The following detailed description references the drawings, wherein.

DETAILED DESCRIPTION

A computing device can include a storage component to include content. For the purposes of this application, the content can be a photo, a video, an article, alphanumeric text, and/or any combination thereof. In one example, the content can be received from one or more content providers. A content provider can be a server, a storage component, a website, and/or any additional device which can provide content to the computing device. The website can include a social media website, a blog, a forum, an archive, a news site, and/or any additional content provider including content.

The computing device can generate an image including content positioned at one or more locations of an image. The image can be a digital media file which can be displayed or printed for viewing. Once the image with the content has been created, the computing device can generate active regions at locations of the image including the content. For the purposes of this application, an active region includes an accessible area of the image which includes content. The active region can include an accessible link, such as a web address, corresponding to the content included at the accessible region. In one example, the accessible link can be an address of a content provider or storage component hosting the content included at the active region. In another example, the accessible link can be a predefined address directed to comments, a website, and/or a file associated with the content at the corresponding active region.

Information of the active regions and their corresponding active links can be transmitted to another device capturing a view of the image. As a result, if a user of the other device accesses an active region, the other device can launch an accessible link associated with the content located at the accessed active region for the user to view.

Figure 1:
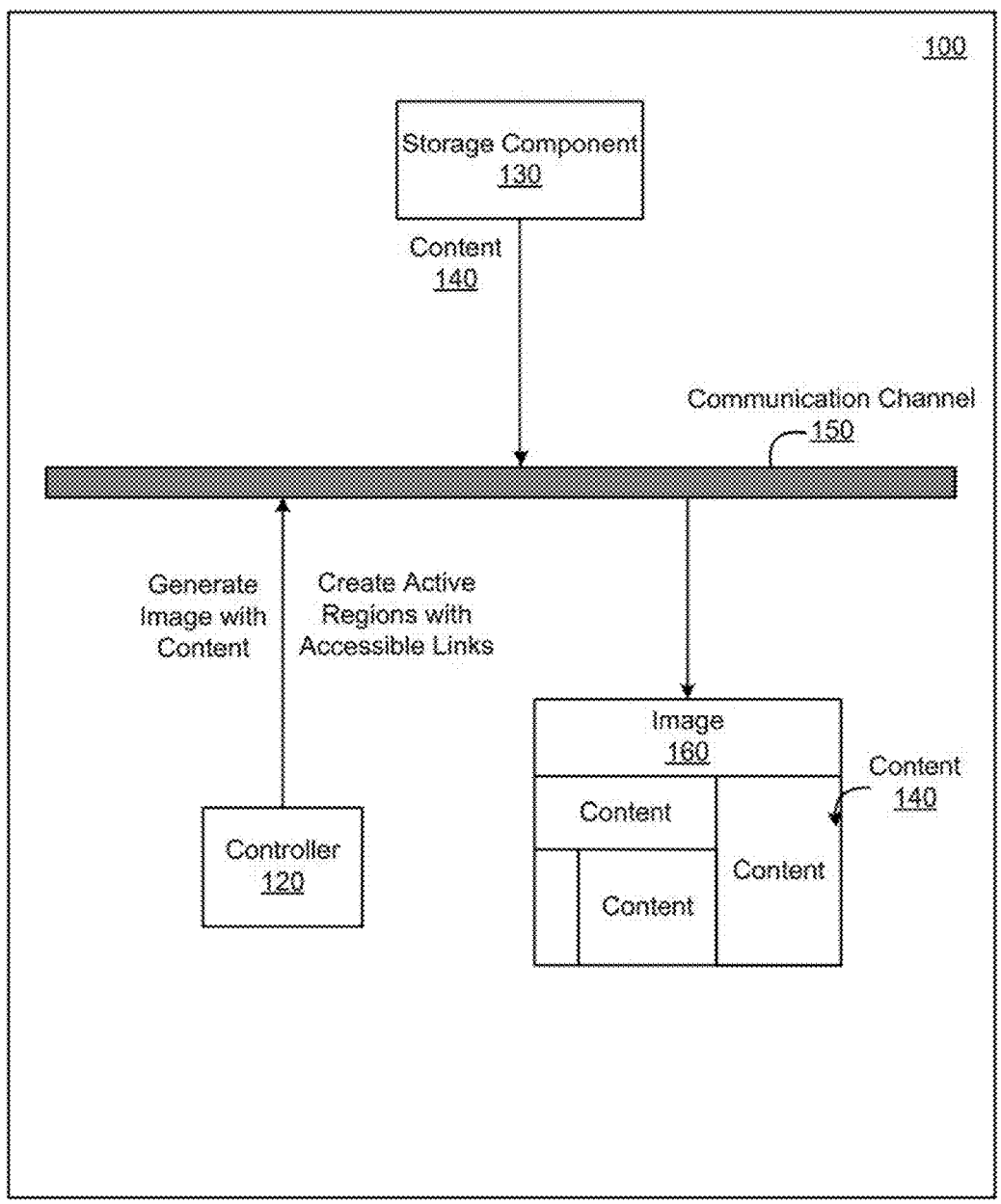
FIG. 1 illustrates a computing device to create active regions with accessible links for content included in an image according to an example.

FIG. 1 illustrates a computing device 100 to create active regions with accessible links for content 140 included in an image 160 according to an example. The computing device 100 can be a notebook, a netbook, a tablet, a desktop, a workstation, a server, and/or an all-in-one system. In another example, the computing device 100 can be a cellular device, a smart phone, a PDA (Personal Digital Assistant), an E (Electronic)-Reader, and/or any additional computing device 100 to create an image 160.

The computing device 100 includes a controller 120, a storage component 130, and a communication channel 150 for the computing device 100 and/or components of the computing device 100 to communicate with one another. In one embodiment, the computing device 100 also includes an image application stored on a non-volatile computer readable medium included in or accessible to the computing device 100. The image application is firmware or an application which can be utilized independently and/or in conjunction with the controller 120 to manage an image 160.

For the purposes of this application, the image 160 includes content 140 positioned at one or more locations of the image 160. The image 100 including the content 140 can be stored as a digital media file on the storage component 130. The content 140 can be a photo, a video, an article, alphanumeric text, and/or any combination thereof which can be positioned at one or more locations of the image 160. The content 140 is stored on a storage component 130 of the computing device 100. The storage component 130 can be a hard drive, an optical drive, a flash drive, a network storage device, and/or any additional storage device to include content 140. In one embodiment, the content 140 can be received from a content provider, such as a server, a storage component, a website, and/or any additional device which can provide content 140 to the computing device 100.

When populating the image 160 with content 140, the controller 120 and/or image application identify locations of the image 160 to include the content 140 and/or a size of the content 140. The location corresponds to coordinates of the image 160 where the content 140 is to be included. The controller 120 and/or the image application can utilize a predefined template, a block recursive image composition layout module, an interactive design use module, and/or a user selection process to identify locations of the image 160 to include the content 140 and/or a size of the content 140.

In response to populating the image 160 with content 140, the controller 120 and/or the image application generate active regions for locations of the image 160 including the content 140. For the purposes of this application, an active region is an accessible area of the image 160 including content 140. The controller 120 and/or the image application can generate the active regions as a layer overlapping the image 160. The controller 120 and/or the image application identify coordinates of the image 160 including the content 140. As a result, the controller 120 and/or the image application generate a location and/or a size of an active region based on a location and/or size of a corresponding content. For example, if a first piece of content is located at the top of the image 160 and the size of the content is X, the corresponding active region is also located at the top of the image 160 with a size of X.

In response to generating the active regions, the controller 120 and/or the image application associate each active region with accessible links corresponding to the content located at the active region. For the purposes of this application, an accessible link is an address, such as a URL (uniform resource locator) or an IP (internet protocol) address associated with the content included in the corresponding active region. In one example, the accessible link can be an address of a content provider or storage component hosting the content 140 included at the active region. In another example, the accessible link can be a predefined address directed to comments, a website, and/or a file associated with the content 140 at the corresponding active region. The controller 120 and/or the image application can further store information of the active regions and/or the accessible links on metadata of the image 160 or as a file associated with the image 160.

Figure 2A:
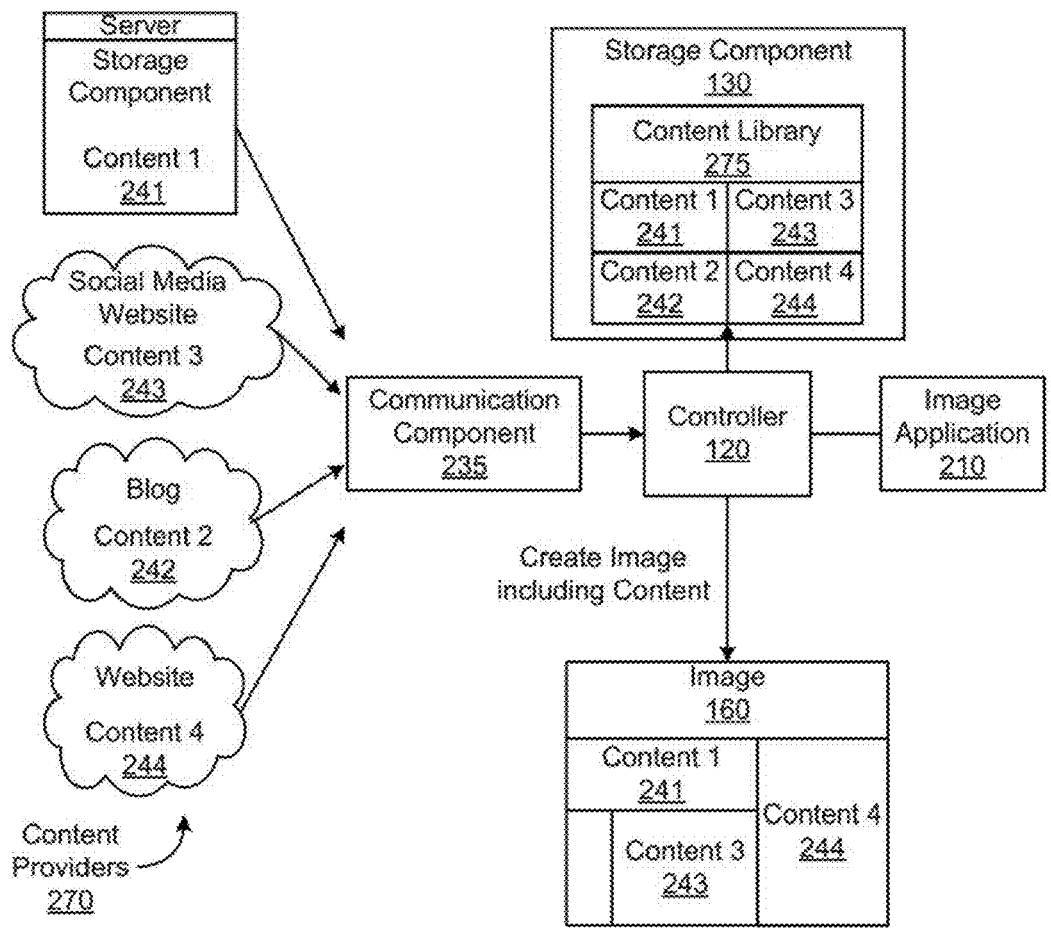
FIG. 2A and FIG. 2B illustrate an image application to generate an image with content and to create active regions with accessible links for locations of the image according to examples.
Figure 2B:
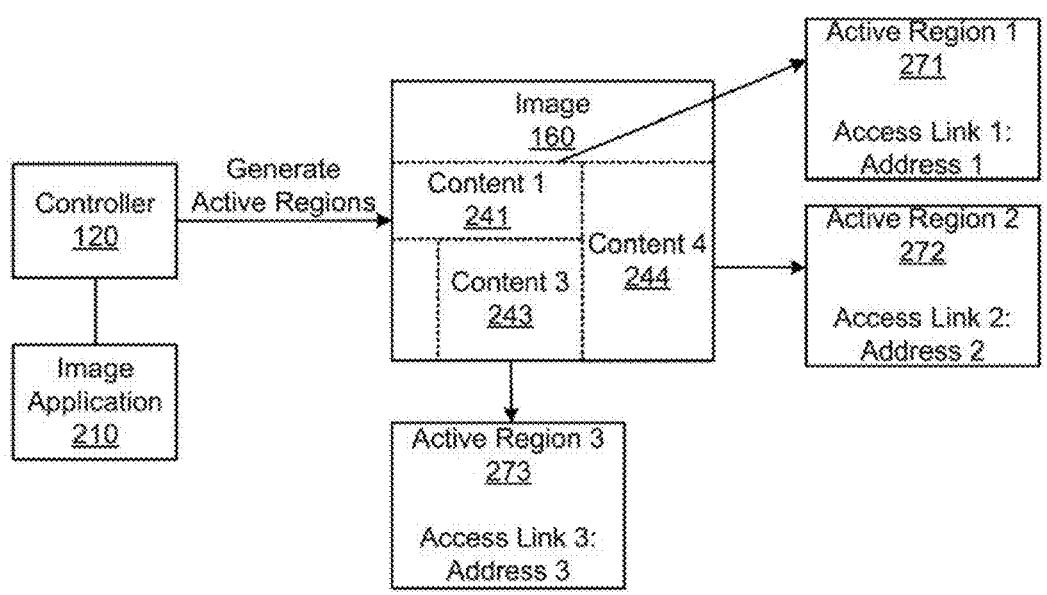

FIG. 2A and FIG. 2B illustrate an image application 210 to generate an image 160 with content and to create active regions with accessible links for locations of an image according to examples. As noted above, the image application 210 can be utilized independently and/or in conjunction with the controller 120 to manage an image. In one embodiment, the image application 210 can be a BIOS (Basic Input/Output System) of the computing device, in another embodiment, the image application can be firmware embedded onto a component of the computing device. In other embodiments, the image application 210 is an application accessible from a non-volatile computer readable memory of the computing device. The computer readable memory is a tangible apparatus that contains, stores, communicates, or transports the application for use by or in connection with the computing device. The computer readable memory can be a hard drive, compact disc, flash disk, network drive or any other tangible apparatus coupled to the computing device.

In one embodiment, the computing device can include a communication component 235 to receive content from one or more content providers 270. The communication component 235 is a hardware communication component, such as a network interface card, a network adaptor, a wireless adaptor, a Bluetooth component, a Near Field Communication component, and/or infrared component, which receives content from content providers 270. For the purposes of this application, a content provider 270 can be server, a storage component, a website, and/or any additional device which can provide content to the computing device through the communication component 235. The website can include a social media website, a blog, a forum, an archive, a news site, and/or any additional content provider including content.

As noted above, the content can be a photo, a video, an article, alphanumeric text, and/or any combination thereof. The alphanumeric text can be an entry, comment, review, or post included on the website. The communication component 270 can of the content providers 270 for the content or the content providers 270 can automatically transmit content to the communication component 235. The content providers 270 can transmit to the content to the communication component 235 when new content is available and/or based on a schedule, such as hourly, daily, weekly, monthly, and/or yearly.

In one example, the communication component 235 polls content providers 270 which are associated with a specific user or customer. The communication component 270 can provide authentication information for the user or customer, such as a username and/or password, to gain access to the associated content providers 270. In response, the content providers 270 can provide the user associated content to the communication component 235. The controller 120 and/or the image application 210 store the received content on the storage component 130.

The controller 120 and/or the image application 210 can also aggregate the content into a content library 275. The content library 275 can be a data structure, such as a list, table, and/or database which includes the content from the content providers 270. The content library 275 can be stored on a storage component (not shown) of the computing device. In one example, as shown in FIG. 2A, the content library 275 can include Content 1 241 from the server, Content 2 242 from the blog, Content 3 243 from the social media website, and Content 4 244 from the website. The content library 275 creates entries for each of the received content.

An entry of the content library 275 can further specify whether the content for the entry is a photo, a video, an article, alphanumeric text, and/or a combination of text and media. The entry can also include information of the content provider 270 which the corresponding content was received from. The information can identify a name and/or address of the content provider. In other examples, the entry and/or the content library 275 can include other information of the corresponding content or the content provider 270 in addition to and/or in lieu of those noted above.

The controller 120 and/or the image application 210 create an image 160 and populate the image 160 with content from the content library 275. The controller 120 and/or image application 210 initially identify a location of the image to include content end/or a site of the content. The location corresponds to coordinates of the image 160 where the content is to be included. The controller 120 and/or the image application 210 can utilize a predefined template, a block recursive image composition layout module, an interactive design use module, and/or a user selection process to identify the location of the image 160 to include the content and/or a size of the content. As shown in the present example, the controller 120 and/or the image application 210 populate the image 160 with Content 1 241 positioned at the top left of the image 160, Content 4 244 positioned to the right of the image 160, and Content 3 243 positioned below Content 1 241 and to the left of Content 4 244.

In one embodiment, the controller 120 and/or the image application 210 further determine if the image 160 includes a threshold number of recognizable features. The recognizable features correspond to unique content of the image 160 which the controller 120 and/or the image application 210 utilize to distinguish the image 160 from other images. If the image 160 includes the threshold number of recognizable features, the image 160 can be readily identified in response to the controller 120 and/or the image application 210 receiving a query of the image 160 and/or content of the image 160. The threshold number of recognizable features can be predefined by the controller 120, the image application 210, and/or by a user of the computing device. If the image 160 is determined to not include the threshold number of recognizable features, the controller 120 and/or the image application 210 proceed to modify a layout of the image or modify the content included in the image 160.

As shown in FIG. 2B, once the image 160 has been populated with content, the controller 120 and/or the image application 210 generate active regions at locations of the image 160 where content is included. An active region includes an accessible area of the image 160 including content. For example, the accessible area can include the coordinates of the image 160 where the corresponding content is located. The controller 120 and/or the image application 210 create active regions for each piece of content included in the image 160. The controller 120 and/or the image application 210 can generate the active regions as a transparent layer overlapping the image 160. For example, Active Region 1 271 is created over the coordinates of the image 160 including Content 1 241; Active Region 2 272 is created over coordinates of the image 160 including Content 4 244; and Active Region 3 231 is created over coordinates of the image 160 including Content 4 244.

As shown in FIG. 2B, each active region includes a corresponding accessible link, Active Link 1 corresponds to Active Region 1 271, Active Link 2 corresponds to Active Region 2272, and Active Link 3 corresponds to Active Region 3 273. For the purposes of this application, an accessible link is an address, such as a URL end/or an IP address associated with the content included in the corresponding active region. The accessible link can direct to a web or IP address of a content provider hosting the content in the corresponding active region. In another example, the accessible link directs towards interact search results including the content. In other examples, the accessible link directs towards a file of the content or another file associated with the content.

In response to generating the active regions with accessible links, the controller 120 and/or the image application 210 store information of the active regions and the accessible links as metadata of the image 160 or as a file associated with the image 160. For example, the information can specify the number of active regions, a location of the active regions and their corresponding content, and an address of the accessible links associated with the active regions. The image 160 with the metadata or the file is stored on the computing device, a database, and/or on a server. The image 160 can be printed on a surface or on physical media for another device to view. In another example, the image 160 is displayed on a display component, such as a monitor, a liquid crystal display, a cathode ray tube, and/or a project for another device to view.

Figure 3A:
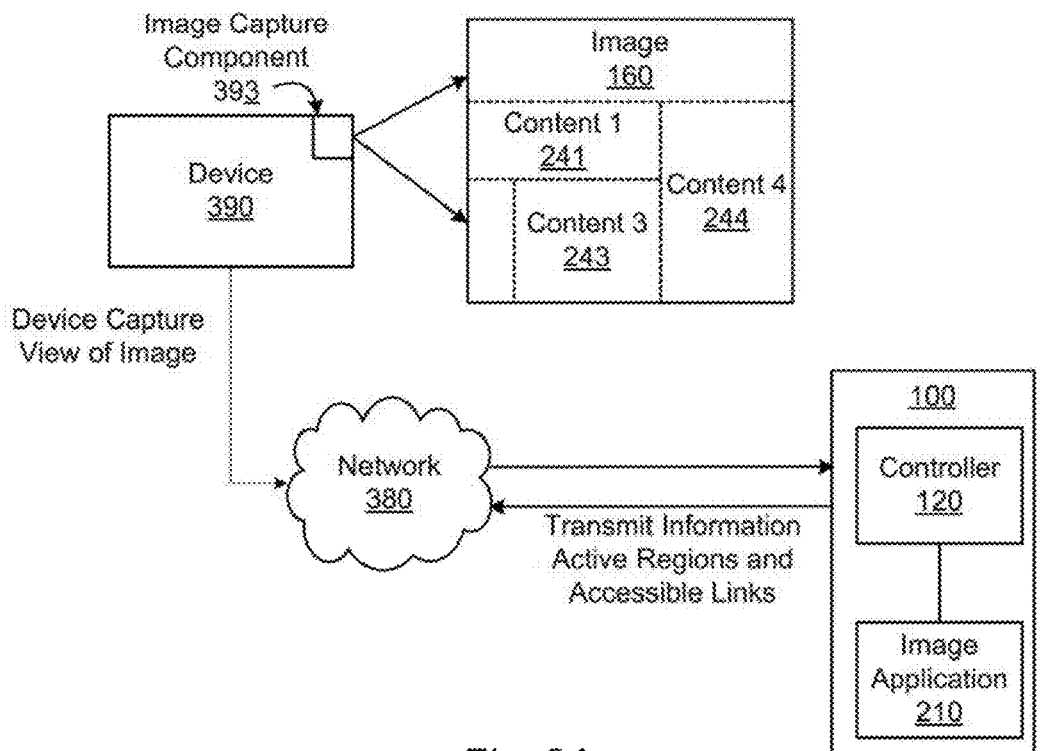
FIGS. 3A and 3B illustrate a device capturing a view of an image with active regions and accessible links according to an example.
Figure 3B:
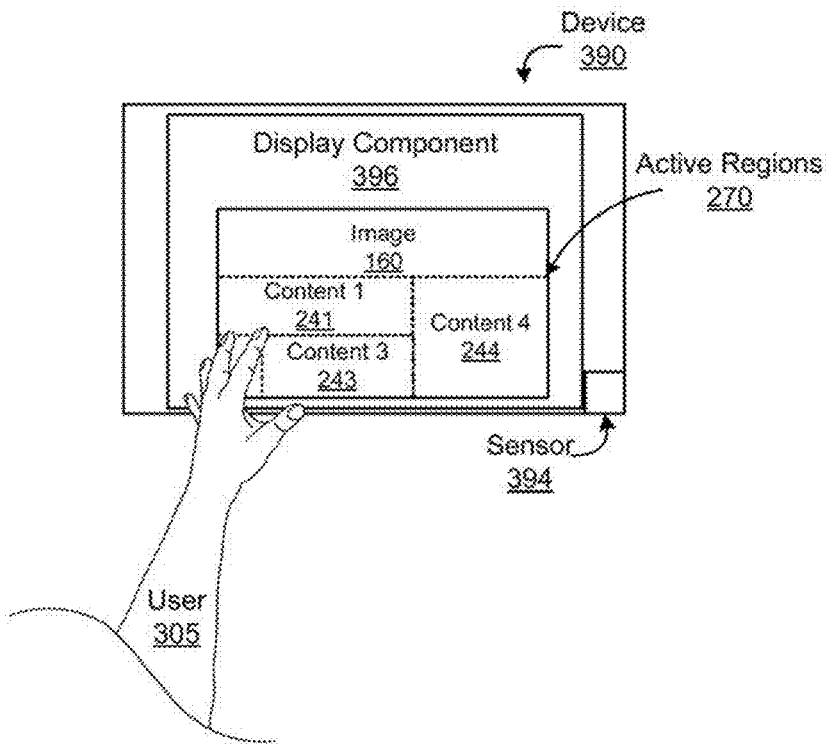

FIGS. 3A and 3B illustrate a device 390 capturing a view of an image 160 with active regions and accessible links according to an example. The device 390 can be a cellular device, a smart phone, a PDA, an E-Reader, a notebook, a netbook, a tablet a desktop, a workstation, a server, an all-in-one system and/or any additional computing device which can capture a view of the image 160 with an image capture component 393, such as a camera. As noted above, the image 160 including content can be displayed or printed on a display component, a surface, or on physical media.

The image capture component 393 can capture a view of the image 160, including all of the content in the image 160. In another embodiment, as opposed to the image capture component 393 capturing the whole image 160, the image capture component 393 captures a view of each content included in the image 160. In response to capturing a view of the image 160, the device 390 sends information of the image 160 and/or the content as a query through a network 380 to the communication component 130 of the computing device. The network 380 can include one or more computing devices which can be coupled directly to one another and/or indirectly through a router, a switch, and/or a hub.

The query can include a file of the image 160 or a file of the content included in the image 160. In another example, the query can include a description of the image 160 and/or the content included in the image 160. In response to receiving the query, the controller 120 and/or the image application 210 determine if the received query of the captured image matches the image 160. In one embodiment, the controller 120 and/or the image application 210 can further determine if the received query includes a threshold of recognizable features. The threshold can be the same number of recognizable features previously defined above by the controller 120, the image application 210, and/or by a user of the computing device.

If the query includes the threshold of recognizable features and matches the image 160, the controller 120 and/or the image application 210 transmit information of the active regions with the accessible links for the image 160 to the device 390 through the network 380. The information can be sent as a file identifies where the active regions are located on the image 160 and their corresponding accessible links. In another example, if the image 160 and information of the active regions and accessible links are stored on another device, the query can be sent to other devices coupled through the network 380. Once the image 160 has been found on a corresponding device, the corresponding device transmits information of the active regions and accessible links to the device 390. The corresponding device can be a database, server, and/or another computing device coupled to the network 380.

As shown in FIG. 3B, in response to receiving information of the active regions 270 and the accessible links, the device 390 proceeds to display the image 160 on a display component 396, such as a LCD screen, a CRT screen, and/or a touch screen of the device 390. The device 390 further generates the active regions 270 with the accessible links over their corresponding content on the displayed image 160. The active regions 270 can be generated as a transparent layer overlapping the displayed image 160.

The display component 396 can further highlight an outline of the active regions on the displayed image 160. Once the image 160 and the active regions 270 are rendered for display, a sensor 394, such as a touch sensor, a proximity sensor, and/or the image capture component 393 detect for a user 305 of the device 390 accessing an active region 270. In another embodiment, an input component, such as a mouse or keyboard, can be used by the user to access an active region 270. The user 305 can be any person which can access an active region 270 by touching an active region 270 for the sensor 394 to detect or by manipulating an input component to access the active region 270. In response to accessing an active region 270, a corresponding accessible link corresponding to the content included at the accessed active region is launched by the device 390. As noted above, an accessible link can be a web address, URL, and/or IP address of a content provider which includes the content.

Launching an accessible link can include the device 390 viewing a webpage, social media website, image gallery, and/or blog including the content with the display component 396. In another example, launching the accessible link can include viewing the content from the accessible link without viewing other information from the content provider. In other examples, launching the accessible link can include receiving a file of the content, such as a media file of the content, from the accessible link and displaying the content on the display component 396. In one example, if Content 1 241 is hosted on Content Provider 1 and active region 1 is accessed by the user 305, the device 390 can proceed to launch a web address directed to Content Provider 1.

Figure 4:
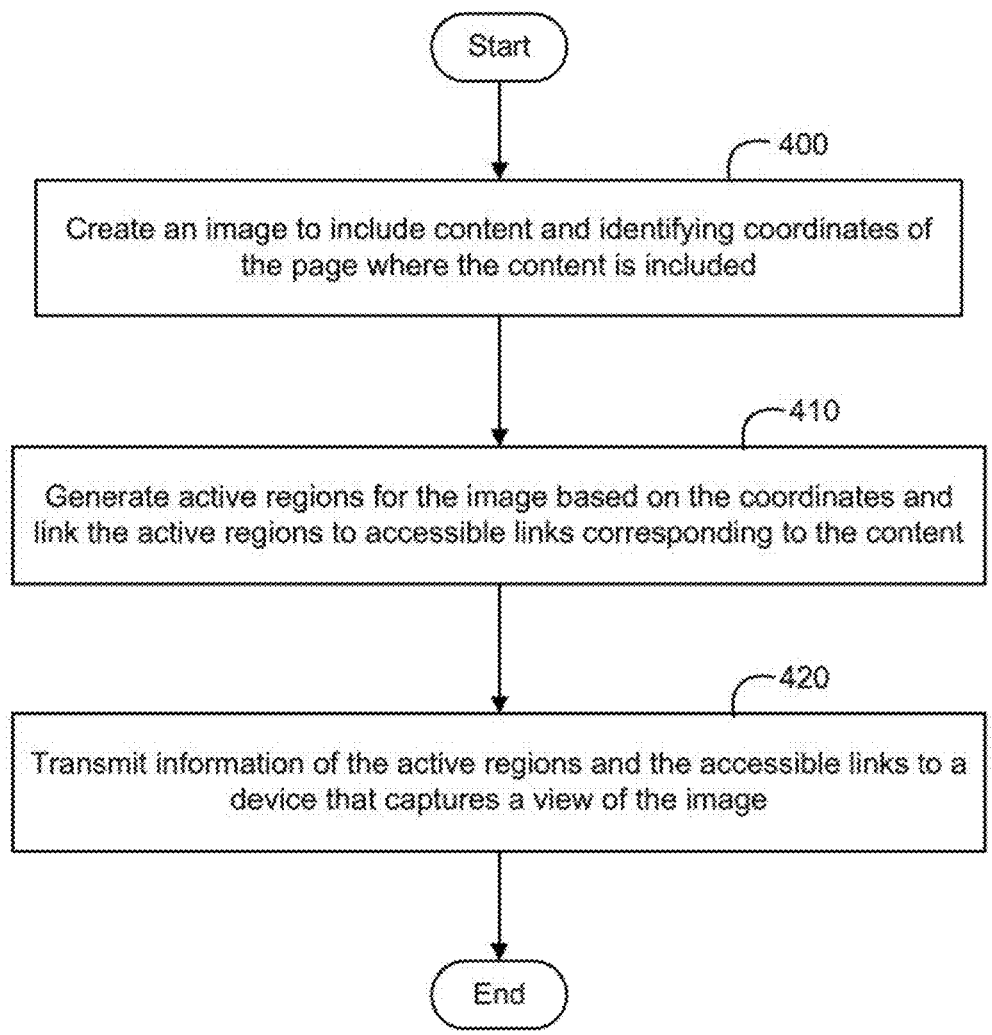
FIG. 4 is a flow chart illustrating a method for managing an image according to an example.

FIG. 4 is a flow chart illustrating a method for managing an image according to an example. The controller and/or the image application initially create an image to include content, and identifying coordinates of the page where the content is included at 400. As noted above, the content is aggregated from content providers accessible through a communication component of the computing device. The controller and/or the image application proceed to generate active regions for the image based on the coordinates and associate the active regions to accessible links corresponding to the content at 410.

The image with the content can be printed out for a device to capture a view of. In another example, the image with the content can be displayed on a surface or a display component for the device to capture a view of. If the device captures a view of the image, the device transmits information of the image and/or the content to the computing device. The computing device then transmits information of the active regions and the accessible links to the device at 420. If a user of the device accesses an active region, the device launches an accessible link associated with the content included in the active region. The method is then complete. In other embodiments, the method of FIG. 4 includes additional steps in addition to and/or in lieu of those depicted in FIG. 4.

Figure 5:
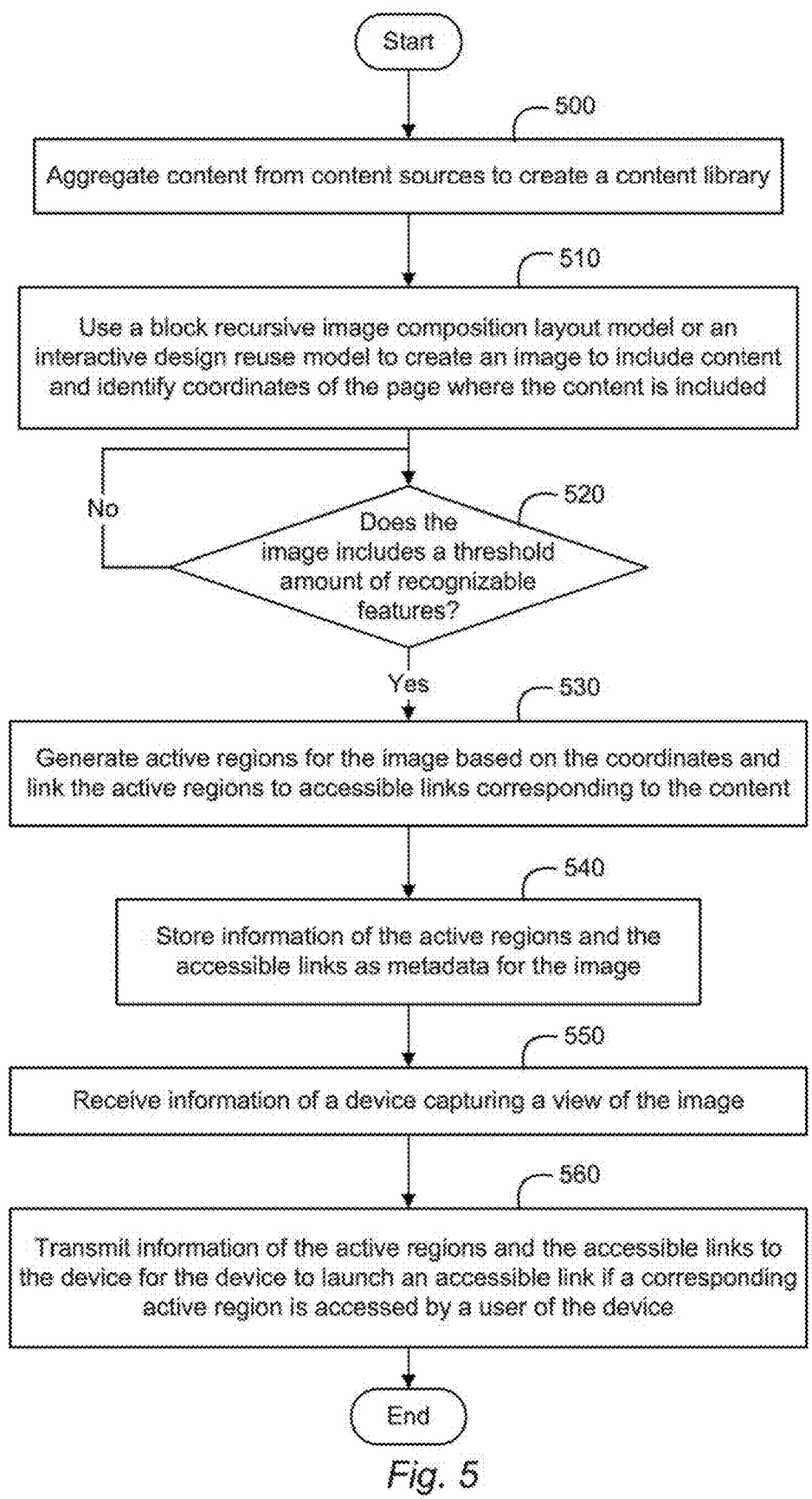
FIG. 5 is a flow chart illustrating a method for managing an image according to another example.

FIG. 5 is a flow chart illustrating a method for managing en image according to another example. The controller and/or the management application initially aggregate content from content providers to create a content library at 500. The controller and/or the image application can use a block recursive image composition layout model or an interactive design reuse model to create an image to include the content and identify coordinates of the page where the content is included at 510. Once the image has been created, the controller and/or the image application determine if the image includes a threshold amount of recognizable features at 520. If the image does not include the threshold amount of recognizable features, the controller and/or the image application can modify the amount of content or the amount of content included within the image.

If the image includes the threshold amount of recognizable features, the controller and/or the image application proceed to generate active regions for the image based on the coordinates of the content and associate the active regions to accessible inks corresponding to the content at 530. Information of the active regions and the accessible links can be stored as metadata for the image or as a file associated with the image at 540. The metadata and/or file including information of the active regions and accessible links can be provided to a device capturing a view of the image at 550. The device can capture a view of the image and send information of the image and/or the content to the computing device.

The information can include a copy of the image with the content. In another example, the information includes copies of the content and locations of the content on the image. In response to receiving the information, the controller and/or the image application transmit information of the active regions and the accessible links to the device at 560. If a corresponding active region is accessed by a user of the device, the device can launch an accessible link at 560. The method is then complete. In other embodiments, the method of FIG. 5 includes additional steps in addition to and/or in lieu of those depicted in FIG. 5.

What is claimed is:

1. A computer device comprising:
a camera to capture an image generated by a system external to the computer device, the image having a first predefined threshold quantity of recognizable features that correspond to pieces of content included in the image that are usable to distinguish the image from other images, the content obtained by the system from a content provider other than the computer device, the provider comprising one of a website, a blog, a social media website and a storage component, wherein a layout of a plural pieces of the content included in the populated image are modified if the image does not include the first predefined threshold quantity of recognizable features corresponding to unique pieces of content;
a processor; and
a non-transitory storage medium storing instructions executable on the processor to:
send a query based on the captured image over a network to the system;
receive, from the system responsive to the query if the system determines that the query includes a second predefined threshold quantity of the recognizable features, active regions for locations of the image including respective pieces of content, and receive accessible links corresponding to the pieces of the content, the accessible links associated with the active regions;
cause display of the image and the active regions in the displayed image, the displayed active regions highlighted in the displayed image;
receive user selection of a first active region of the displayed active regions, the first active region associated with a first accessible link of the accessible links; and
cause retrieval, from a content provider over the network, of content data referenced by the first accessible link.

2. The computer device of claim 1, wherein the captured image is of the content printed on a physical medium or displayed on a surface.

3. The computer device of claim 1, wherein the content includes at least one of a photo, a video, an article, or an alphanumeric text.

4. The computer device of claim 1, wherein locations of the active regions and the accessible links corresponding to the pieces of the content are part of metadata of the image.

5. The computer device of claim 1, wherein an accessible link of the accessible links includes an address directing to the content provider.

6. The computer device of claim 1, wherein the accessible links comprise web addresses, uniform resource locators (URLs), or Internet Protocol (IP) addresses.

7. The computer device of claim 1, wherein the instructions are executable on the processor to cause display of the piece of content referenced by the first accessible link.

8. The computer device of claim 1, wherein the query comprises a file including the image or a file including the content of the image.

9. The computer device of claim 1, wherein the information including the active regions and the accessible links are received by the computer device in response to the system matching the query to an image stored by the system.

10. The computer device of claim 1, wherein the first and second predefined threshold quantities are identical.

11. The computer device of claim 1, wherein the first and second predefined threshold quantities are different.

12. The computer device of claim 1, wherein two of the pieces of content included in the image are obtained from different providers other than the computer device.

13. A method comprising:
creating, by a computer system, an image to include plural pieces of content received from a content provider, the content provider comprising one of a web site, a blog, a social media website, and a storage component, and a first predefined threshold quantity of recognizable features corresponding to unique pieces of content included in the image that are usable to distinguish the image from other images, the content obtained by the computer system from a provider other than a device which captures a view of the image, and identifying coordinates of the image where respective pieces of the content are included;
modifying a layout of the plural pieces of content included in the populated image if the image does not include the first predefined threshold quantity of recognizable features corresponding to unique content of the image;
generating, by the computer system, active regions of the image based on the coordinates if the image includes a second predefined threshold quantity of recognizable features, each active region of the active regions including a respective piece of the plural pieces of the content, and linking the active regions to accessible links corresponding to the respective pieces of the plural pieces of content;
receiving, by the computer system from the device, a query related to a view of the image captured by the device; and
transmitting, by the computer system, information including the active regions and the accessible links to the device, the active regions selectable by a user at the device to cause retrieval of content data referenced by the accessible links.

14. The method of claim 13, further comprising using a block recursive image composition layout model or an interactive design reuse model to populate the image with the plural pieces of content.

15. The method of claim 13, further comprising receiving information of the device that captured the view of the image before transmitting the information including the active regions and the accessible links to the device.

16. The method of claim 13, wherein the captured view of the image is a view of the image on a physical medium as captured by an image capture component of the device.

17. The method of claim 16, wherein the device:
displays the image including the plural pieces of content on a display;
detects a user accessing an active region of the active regions of the image; and
launches an accessible link of the accessed region to receive the respective piece of the plural pieces of content.

18. The method of claim 17, wherein the display highlights the active regions of the image.

19. The method of claim 13, further comprising:
matching, by the computer system, the query to an image stored by the computer system,
wherein the transmitting of the information is in response to the query being matched to the image stored by the computer system.

20. The method of claim 13, wherein at least one of the plural pieces of content is received by the computer system from a different content provider than at least one other one of the plural pieces of content.

21. A non-transitory computer-readable medium comprising instructions that when executed cause a computer system to:
populate an image with plural pieces of content from content providers, the content providers comprising one of a website, a blog, a social media website and a storage component, which captures a view of the populated image, and create active regions for locations of the image including the plural pieces of content;
determine if the populated image includes a first predefined threshold quantity of recognizable features corresponding to unique content of the image, the features usable to distinguish the image from other images;
modify a layout of the plural pieces of content included in the populated image if the populated image does not include the first predefined threshold quantity of recognizable features corresponding to unique content of the image;
associate the active regions with accessible links corresponding to the plural pieces of content if the populated image includes a second predefined threshold quantity of recognizable features corresponding to unique content of the image;
generate a viewable image using the populated image;
receive, over a network, information based on a captured view of the viewable image, the captured view captured by a camera of the device; and
in response to the received information, transmit, over the network, information including the active regions and the accessible links to the device, the active regions selectable by a user at the device to cause retrieval of content data referenced by the accessible links.

22. The non-transitory computer-readable medium of claim 21, wherein the instructions when executed cause the computer system to further:
determine if the captured view of the image includes a threshold amount of recognizable features,
wherein the transmitting of the information is in response to the captured view of the image including the threshold amount of recognizable features and the captured view of the image matching an image stored by the computer system.

* * * * *

UNITED STATES PATENT AND TRADEMARK OFFICE
CERTIFICATE OF CORRECTION

PATENT NO. : 10,210,273 B2
APPLICATION NO. : 14/420096
DATED : February 19, 2019
INVENTOR(S) : Qian Lin et al.

Page 1 of 1

It is certified that error appears in the above-identified patent and that said Letters Patent is hereby corrected as shown below:

In the Claims

In Column 9, Line 9, in Claim 13, delete "web site," and insert -- website, --, therefor.

Signed and Sealed this
Nineteenth Day of November, 2019

Andrei Iancu
*Director of the United States Patent and Trademark Office*